United States Patent [19]

Glancy

[11] Patent Number: 4,531,769
[45] Date of Patent: Jul. 30, 1985

[54] HOOK LATCH FOR AN ENGINE COWLING

[75] Inventor: Jerry L. Glancy, Wichita, Kans.

[73] Assignee: The Boeing Company, Seattle, Wash.

[21] Appl. No.: 411,418

[22] Filed: Aug. 25, 1982

[51] Int. Cl.³ .......................... E05C 19/14; E05C 5/00
[52] U.S. Cl. ..................................... 292/113; 292/108;
292/DIG. 31; 292/DIG. 49
[58] Field of Search ............... 292/100, 108, 113, 210,
292/247, DIG. 31, DIG. 49; 70/208

[56] References Cited

U.S. PATENT DOCUMENTS

| 2,655,027 | 10/1953 | Lynxwiler | 70/208 |
| 2,712,955 | 7/1955 | Andrews | 292/113 |
| 2,894,777 | 7/1959 | Hogan | 292/113 |
| 2,904,141 | 9/1959 | Henrichs | 292/113 X |
| 3,259,412 | 7/1966 | Wheeler | 292/113 |
| 3,347,578 | 10/1967 | Sheehan et al. | 292/113 |
| 4,318,557 | 3/1982 | Bourne et al. | 292/113 |

Primary Examiner—Thomas J. Holko
Assistant Examiner—Russell W. Illich
Attorney, Agent, or Firm—Edwin H. Crabtree

[57] ABSTRACT

An improved latch for securing together a pair of hinged cowlings surrounding an aircraft engine. The latch is characterized by having a safety lock for engaging a hook when the latch is in a locked or latched position and also for engaging the hook when the hook has been disengaged from a latch keeper thereby allowing the operator of the latch to engage and disengage the cowlings using only one hand.

7 Claims, 6 Drawing Figures

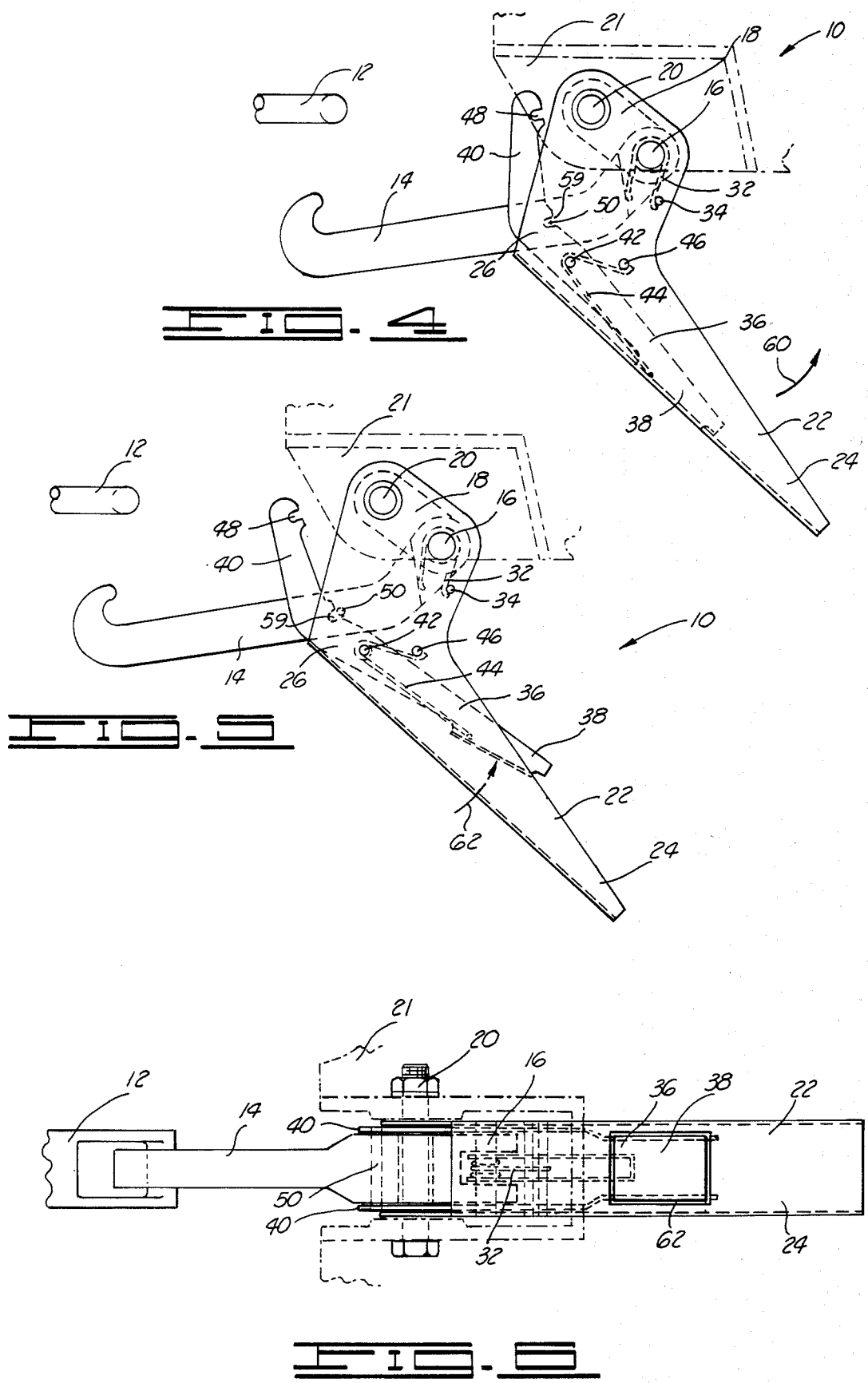

HOOK LATCH FOR AN ENGINE COWLING

BACKGROUND OF THE INVENTION

This invention relates to an improved latch for securing together two members and more particularly but not by way of limitation to a latch for securing together a pair of hinged cowlings surrounding an aircraft engine.

Prior to the subject invention a problem existed with some aircraft cowling latches in that maintenance personnel were required to use both hands when hooking up or unlocking the cowling latches. This is especially true with an overcenter hook type latch since this type of latch has an internal spring force acting against the latch handle and the latch hook, forcing the two apart usually toward an open direction thereby moving the hook away from the latch keeper. The latch keeper being attached to an opposing hinged cowling is usually an eye bolt, "U" bolt or standard bolt or a pin.

For latching a standard overcenter hook latch, the sequence of operation required the two hinged cowlings to be brought together and aligned by some means and then latched. The operator then grasps the latch handle with one hand and with the other hand moves the latch hook into a position near the keeper. He then rotates the handle toward the closed position while holding the hook until it engages the keeper. The operator continues rotating the handle to its fully closed position to complete the latching cycle. By rotating the handle to the closed position the hook is moved overcenter or past a centerline through the keeper and the bolt securing the handle to the cowling and thereby increasing the latching force to a present amount. A safety lock on the latch is automatically engaged upon closing and prevents the latch from inadvertently opening due to the relaxing of the forces between the cowling halves.

In unlatching the hook latch, the operator depresses the safety lock allowing the handle to rotate freely toward an open position. The free rotation of the handle gives the operator room to grasp the handle. The free rotation occurs after release of the safety lock but does not effect the hook-up forces. The handle is then rotated toward the open position which in turn moves the pivot of the hook overcenter releasing the latching forces. Further rotation causes the hook to be disengaged from the latch keeper. However, depending on the latch geometry, handle rotation and/or latch mounting position, the hook may or may not be free of the keeper. Therefore, the operator must use one hand to move the hook off of the keeper while the other hand moves the handle. The subject invention eliminates the above mentioned problem of the operator having to use both hands in securing or releasing the latch hook from the latch keeper.

Heretofore there have been various types of latches such as those described in U.S. Pat. No. 2,712,955 to Andrews, U.S. Pat. No. 2,894,777 to Hogan, U.S. Pat. No. 2,927,812 to Smith et al, U.S. Pat. No. 3,259,412 to Wheeler and U.S. Pat. No. 4,318,557 to Bourne et al. None of the latches described in the above mentioned patents particularly point out the unique structure and features of the improved latch and the advantages of this latch as described herein.

SUMMARY OF THE INVENTION

The subject invention incorporates an improved latch which locks the handle and hook together either in a closed or opened position. This allows the operator to use only one hand to latch or unlatch the cowling halves. The one hand operation is beneficial to the operator when the operator has limited access or particularly no access in the latch keeper area.

Also, the improved latch is beneficial when the operator must use his free hand to force the cowling halves together for latching.

The improved latch for securing together a pair of cowlings surrounding an aircraft engine includes a latch keeper secured to one of the hinged cowlings. A hook is pivotally mounted on the other hinged cowling. A hook release handle is pivotally mounted on the hook and includes a safety lock attached to the handle. The safety lock has a first slot and a second slot. The first slot is received around a pin on the hook for securing the latch in a locked position. The second slot is received around the pin on the hook for securing the handle to the hook when the hook is in an unlocked position from the keeper.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 4 illustrates the hook unlatched from a latch keeper.

FIG. 5 illustrates a safety lock disengaged from a hook pin on the hook.

FIG. 6 illustrates a bottom view of the improved latch with the latch in a latched and locked position.

DETAILED DESCRIPTION OF THE DRAWINGS

Figure 1:
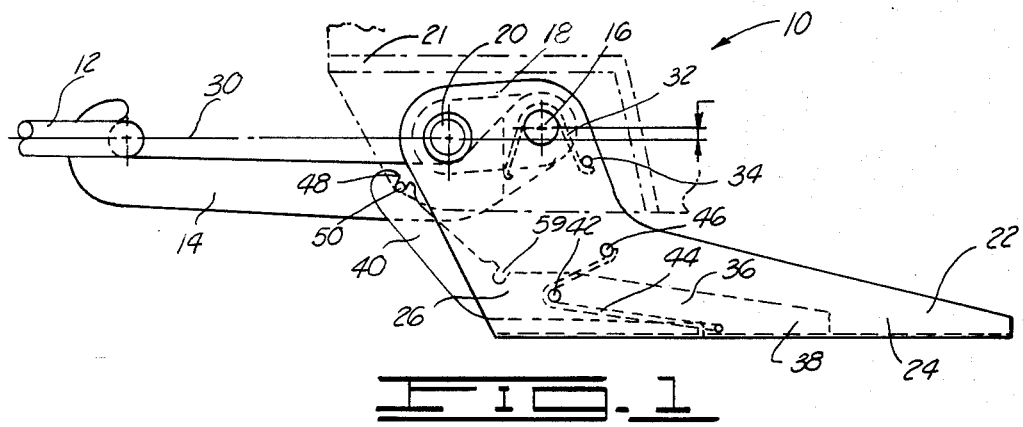
FIG. 1 is a side view of the improved latch in a latched and locked position.

In FIG. 1 the improved latch is shown in a latched and locked position and designated by general reference numeral 10. The latch 10 is used for securing together a pair of hinged cowlings surrounding an aircraft engine or the like.

The improved latch includes a latch keeper 12 which is secured to one of the hinged cowlings to the left of the drawings. A hook is shown engaged to the keeper 12 and designated by reference numeral 14. The hook 14 is pivotally mounted on a hook pivot pin 16 which is attached to a bolt and pivot pin link 18 shown in dotted lines and connected to a latch mounting bolt 20. The bolt 20 is secured to a portion 21 of the other hinged cowling to the right of the drawings. Also pivotally mounted on the hook pivot pin 16 and bolt 20 is a hook release handle 22 having a first end portion 24 and a second end portion 26.

It should be noted the improved latch 10 is an overcenter type latch wherein the hook pivot pin 16 when the latch 10 is in a latched and locked position is overcenter and past a centerline 30 through the center of the latch keeper 12 and the latch mounting bolt 20. Further the hook pivot pin 16 is spring biased in a locked position by a handle torsion spring 32 mounted around the pin 16 with one end engaging a mounting pin 34.

To further insure the latch 10 is held in a latched and locked positon a safety lock 36 having a first end portion 38 and a second end portion 40 is pivotally mounted to the handle 26 on a lock pivot pin 42. One end of a lock portion spring 44 is disposed around the pin 42 with the other end of the spring 44 engaging a mounting pin 46. The lock 36 is biased in a clockwise direction by the spring 44. The second end portion 40 includes a first slot 48 for engaging a hook pin 50 attached to the side of the hook 14. The safety lock 36 insures the latch 10 stays in a latched and locked position should the forces holding the cowling halves together be relaxed during the operation of the aircraft engine.

Figure 2:
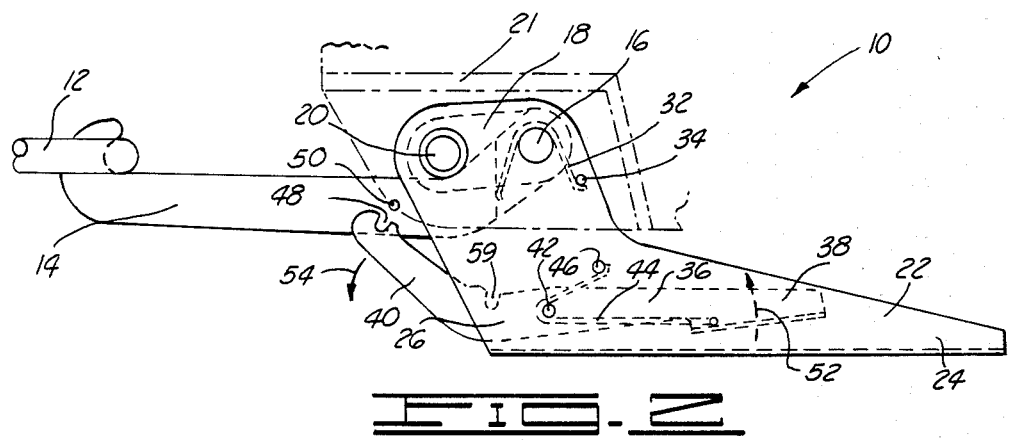
FIG. 2 illustrates the latch in a latched but unlocked position.

In FIG. 2 the first end portion 38 of the safety lock 36 had been pressed in a counter clockwise direction as indicated by arrow 52. At this time, the spring 44 is compressed with the safety lock 36 rotating on pin 42 in a counter clockwise direction as indicated by arrows 54 thereby releasing the first slot 48 from the pin 50. At this time, the safety lock has released the latch 10 so the latch may now be unlocked.

Figure 3:
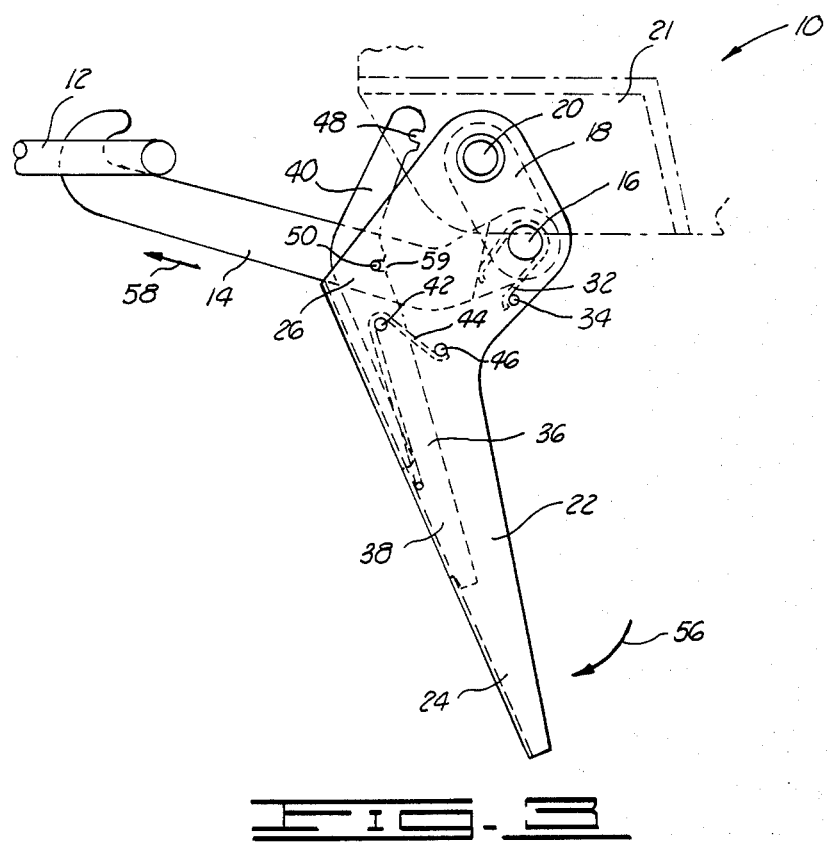
FIG. 3 shows the latch in an unlatched position with a hook locked to a handle.

In FIG. 3 the handle 22 has been rotated in a clockwise direction as indicated by arrow 56. At this time, the hook 14 moves to the left as indicated by arrow 58, releasing the end of the hook 14 from the keeper 12. At the same time the safety lock 36 moves upwardly with the second end portion 40 riding against the side of the pin 50 until a second slot 59 receives the pin 50 therein. In this position the latch 10 has become unlatched but the handle 22 is now locked to the hook 14 so the operator of the latch 10 is free to remove the hook 14 from the keeper 12 by merely rotating the handle 22 in a counter clockwise direction with one hand as shown by the arrow 60 shown in FIG. 4.

In FIG. 5 the hook 14 and handle 22 can be seen released from a locked position to each other by pressing inwardly the first end portion 38 of the safety latch 36 as indicated by arrow 62. At this time the first end portion 38 of the safety lock 36 is rotated in a counter clockwise direction with the second slot 59 being moved away from the pin 50 so the hook 14 is released from the handle 26.

In FIG. 6 a bottom view of the improved latch 10 is illustrated. In this view the hook 14 can be seen in a latched and locked position to the latch keeper 12 with the safety lock 36 engaging the pin 50 mounted on the side of the hook 14. Also in this view the latch mounting bolt 20 can be seen secured to a portion of the cowling 21 and extending through the sides of the handle 22. Also in this view, the first end portion 38 of the safety latch 36 can be seen through an insert 62 in the handle 22. Also shown in dotted lines are the hook pivot pin 16 and handle torsion spring 32.

In operation the improved latch 10 provides a means for the operator of the latch to lock the handle 22 and hook 14 together either in a closed or opened position. This allows the operator to use only one hand to latch or unlatch the cowling halves. The one hand operation is very beneficial to the operator when there is limited access or practically no access to the area housing the latch keeper 12. Also it is beneficial when the operator must use his free hand to force together the cowling halves for securing the cowlings with the improved latch 10.

On latching the cowlings together, the operator rotates the handle 22 and the hook 14 which are held together by the safety lock 36. He positions the hook 14 using the handle 22 near the latch keeper 12 and then depresses the first end portion 38 of the safety lock 36 thereby unlocking the hook 14 from the handle 22. At this time, the handle torsion spring 32 forces the end of the hook 14 against the latch keeper 12. The operator then rotates the handle 22 in a counter clockwise direction toward a closed position causing the hook 14 to engage the keeper 12. Upon completion of the rotation, the hook pivot pin 16 passes the centerline 30 and at the same time, the safety lock 36 engages the pin 50 in the first slot 48. The hook 14 and handle 22 are now securly locked together in a closed position to prevent the inadvertent unlatching of the improved latch 10.

Upon unlatching the latch 10 the operator depresses the safety lock 36 which releases the lock 36 from the pin 50. He then rotates the handle 22 in a clockwise direction to an open position and the safety lock 26 then engages the pin 50 in the second slot 59 thereby again securing the handle 22 to the hook 14. Upon further rotation of the handle 22 in a clockwise position, the hook 14 is moved away from the latch keeper 12 thereby completing the unlatching sequence and the cowling halves are now free to swing open. It can be appreciated from the above description of the operation of the improved latch 10, the operator is free to latch and unlatch the split cowlings surrounding an aircraft engine with only one hand.

Changes may be made in the construction and arrangement of the parts or elements of the embodiments as described herein without departing from the spirit or scope of the invention defined in the following claims.

What is claimed is:

1. An improved latch for securing together a pair of hinged cowlings surrounding an aircraft engine, the latch comprising:
   a latch keeper secured to one of the hinged cowlings;
   a hook release handle pivotally mounted on the other hinged cowling;
   a hook pivotally mounted on the hook release handle; and
   a safety lock attached to the handle, the safety lock having a first securing means for engaging and securing the latch when the latch is in a locked position and a second securing means for engaging and securing the handle to the hook when the hook is unlatched from the keeper.

2. The latch as described in claim 1 wherein the first securing means is a first slot in one end of the safety lock for receipt around a pin on the hook when the hook engages the keeper securing the latch in a locked position.

3. The latch as described in claim 1 wherein the second securing means is a second slot in one end of the safety lock for receipt around a pin on the hook for securing the handle to the hook when the hook is unlatched from the keeper.

4. The latch as described in claim 1 wherein the safety lock is spring biased for engaging the hook when the latch is in a locked position and for engaging the hook when the hook is unlatched from the keeper.

5. The latch as described in claim 1 wherein the hook release handle is mounted on a hook pivot pin attached to one end of the hook.

6. An improved latch for securing together a pair of hinged cowlings surrounding an aircraft engine, the latch comprising:
- a latch keeper secured to one of the hinged cowlings;
- a hook pivotally mounted on a hook pivot pin;
- a hook release handle pivotally attached to the hook pivot pin and mounted on a latch mounting bolt, the bolt secured to the other hinged cowlings; and
- a safety lock attached to the handle, one end of the lock having a first slot and a second slot, the first slot received around a pin on the hook for securing the latch in a locked position, the second slot received around the pin on the hook for securing the handle to the hook when the hook is in an unlatched position from the keeper.

7. The latch as described in claim 6 wherein the safety lock is spring biased for urging the end of the lock having the first slot and second slot therein toward the pin mounted on the hook, by moving the other end of the safety lock inwardly the safety lock is disengaged from the pin on the hook when it is desired to unlatch the hook from the latch keeper or release the handle from the hook when the hook is disengaged from the keeper.

* * * * *